US009434863B2

(12) United States Patent
Drieghe et al.

(10) Patent No.: US 9,434,863 B2
(45) Date of Patent: Sep. 6, 2016

(54) PET-C BASED SECURITY LAMINATES AND DOCUMENTS

(75) Inventors: Vera Drieghe, Kontich (BE); Peter Cantraine, Berchem (BE); Bart Waumans, Puurs (BE); Walther Wouters, Heist-op-den-Berg (BE); Ingrid Geuens, Emblem (BE)

(73) Assignee: Agfa-Gevaert N.V., Mortsel (BE)

( * ) Notice: Subject to any disclaimer, the term of this patent is extended or adjusted under 35 U.S.C. 154(b) by 135 days.

(21) Appl. No.: 14/238,810

(22) PCT Filed: Sep. 3, 2012

(86) PCT No.: PCT/EP2012/067055
§ 371 (c)(1),
(2), (4) Date: Feb. 13, 2014

(87) PCT Pub. No.: WO2013/037651
PCT Pub. Date: Mar. 21, 2013

(65) Prior Publication Data
US 2014/0193638 A1  Jul. 10, 2014

Related U.S. Application Data

(60) Provisional application No. 61/533,822, filed on Sep. 13, 2011.

(30) Foreign Application Priority Data

Sep. 12, 2011  (EP) .................................... 11180928

(51) Int. Cl.
C09J 7/02       (2006.01)
B42D 25/00      (2014.01)
(Continued)

(52) U.S. Cl.
CPC .............. *C09J 7/0296* (2013.01); *B42D 25/00* (2014.10); *C08J 7/042* (2013.01); *B29C 55/10* (2013.01);
(Continued)

(58) Field of Classification Search
None
See application file for complete search history.

(56) References Cited

U.S. PATENT DOCUMENTS 3,649,336 A   3/1972  Van Paesschen et al.
3,725,184 A   4/1973  Scopp
(Continued)

FOREIGN PATENT DOCUMENTS

BE   WO 2009063058 A1 *  5/2009  .......... B29C 55/026
BE   WO 2009121793 A2 * 10/2009  .......... B32B 37/185
(Continued)

OTHER PUBLICATIONS

Product information sheet "UCAR VAGD Solution Vinyl Resin", Dow Chemical Company, Sep. 14, 2015.*
(Continued)

*Primary Examiner* — Hai Vo
*Assistant Examiner* — Anish Desai
(74) *Attorney, Agent, or Firm* — Leydig, Voit & Mayer, Ltd.

(57) ABSTRACT

A security laminate (1) including in order a transparent oriented polyester support (2), a subbing layer (3) and an adhesive layer (4) which is coated on top of the subbing layer, wherein the binder of the adhesive layer is based on a mixture of a first and a second polymer in a weight ratio from 50/50 to 90/10, wherein the first polymer is a copolymer comprising vinyl acetate and at least 85 wt % of vinyl chloride based on the total weight of the first polymer; wherein the second polymer is a copolymer of styrene, butadiene and methylmethacrylate or a copolymer of vinyl butyral, vinyl acetate and vinyl alcohol; and wherein the binder of the subbing layer is based on a polyester-urethane copolymer.

21 Claims, 1 Drawing Sheet

(51) Int. Cl.
*C08J 7/04* (2006.01)
*B29C 55/10* (2006.01)

(52) U.S. Cl.
CPC ....... *B42D 2033/04* (2013.01); *B42D 2033/20* (2013.01); *B42D 2033/30* (2013.01); *B42D 2033/46* (2013.01); *C08J 2367/02* (2013.01); *Y10T 428/264* (2015.01); *Y10T 428/265* (2015.01); *Y10T 428/2848* (2015.01)

(56) References Cited

U.S. PATENT DOCUMENTS

| | | | | |
|---|---|---|---|---|
| 5,171,625 A | * | 12/1992 | Newton | B32B 27/36 428/195.1 |
| 5,202,205 A | * | 4/1993 | Malhota | G03G 7/0013 347/105 |
| 5,204,432 A | * | 4/1993 | Saito | C08G 77/26 528/10 |
| 5,213,648 A | * | 5/1993 | Vermeulen | B32B 7/12 156/307.5 |
| 5,415,912 A | * | 5/1995 | Ushizaka | C09J 11/08 428/41.4 |
| 5,629,259 A | * | 5/1997 | Akada | B41M 5/0256 428/913 |
| 2003/0048343 A1 | | 3/2003 | Anderson et al. | |
| 2004/0081839 A1 | | 4/2004 | Kubo et al. | |
| 2008/0238086 A1 | | 10/2008 | Geuens et al. | |
| 2010/0316841 A1 | * | 12/2010 | Geuens | B32B 37/185 428/137 |

FOREIGN PATENT DOCUMENTS

| | | | |
|---|---|---|---|
| BE | EP 2199100 A1 * | 6/2010 | ............ B41M 5/267 |
| EP | 2335938 A1 | 6/2011 | |
| EP | 2374602 A1 | 10/2011 | |
| GB | 811066 | 3/1959 | |
| GB | 1441591 | 7/1976 | |
| WO | WO 2009/063058 A1 | 5/2009 | |

OTHER PUBLICATIONS

Istvan Benedek and Luc J. Heymans, "Pressure-Sensitive Adhesives Technology", 1997, Marcel Dekker, Inc., p. 143, section 1.3.*
International Search Report in corresponding International Patent Application No. PCT/EP2012/067055, mailed Oct. 25, 2012.

* cited by examiner

PET-C BASED SECURITY LAMINATES AND DOCUMENTS

CROSS-REFERENCE TO RELATED APPLICATIONS

This patent application is a U.S. National Phase Application of copending International Patent Application No. PCT/EP2012/067055, filed Sep. 3, 2012, claiming the benefit of U.S. Provisional Patent Application No. 61/533,822, filed Sep. 13, 2011 and European Patent Application No. 11180928.1, filed Sep. 12, 2011, the disclosures of which are hereby incorporated by reference in their entirety.

TECHNICAL FIELD

This invention relates to security laminates containing a crystalline polyethylene terephthalate (PET-C) substrate and their incorporation into security documents.

BACKGROUND ART

Security cards are widely used for various applications such as identification purposes (ID cards) and financial transfers (credit cards). Such cards typically consist of a laminated structure consisting of various plastic lamellae and layers wherein one or more of them carry visible information, such as alphanumeric information, logos and a picture of the card holder, and optionally also digital information stored in a magnetic strip or in an electronic chip (so-called smart card).

A principal objective of security cards is that they cannot be easily modified or reproduced in such a way that the modification or reproduction is difficult to distinguish from the original. Such modification usually involves de-laminating one or more plastic lamellae from the card, altering the visible information on the card and re-laminating, i.e. closing again, the card.

The most widely used material for lamellae in plastic cards is PVC (polyvinyl chloride), because of its low cost and its ease of printing and laminating. The biggest disadvantage of a PVC card body is the low durability, resulting in an effective lifetime of only 1-3 years, much lower than the lifetime of the often expensive electronic chips. PC (polycarbonate) can be used for longer-life and more secure ID cards, but has a high production cost and a low resistance to torsion, scratching and chemicals. Other materials occasionally used for security card, like Teslin™ and ABS are only suitable for very low-end or single-use cards.

PET-G (polyethylene terephthalate glycolised) is a kind of amorphous polyester which has not been toughened like crystalline polyester but rather processed to become more compatible with standard PVC card manufacturing. Durability of PET-G cards is comparable to that of PVC cards.

There is growing interest for crystalline polyethylene terephthalate (PET-C) as lamellae, especially as outermost lamellae, in security cards. PET-C is a material that is very durable and resistant to mechanical influences (flexion, torsion, scratches), chemical substances, moisture and temperature ranges. Untreated PET-C cannot be sealed or laminated to itself or to other materials, but requires additional adhesive coatings and layers to accomplish this.

Such adhesive layers have been optimized over the years for PVC, PC and other frequently used card materials. For example, U.S. Pat. No. 3,725,184 (ADDRESSOGRAPH MULTIGRAPH) discloses a laminated article in which a composition containing polyvinyl chloride, polyvinyl acetate and polyvinyl alcohol is interposed between a vinyl skin and the printing on the surface of a vinyl core to improve the adhesion between the skin and the printing ink.

US 2004081839 (TEIJIN DUPONT) discloses a polyester adhesive film readily adhering to an ink-receiving layer, having excellent adhesiveness to the ink-receiving layer, excellent transparency and weatherability. US 2003048343 (ANDERSON ET AL.) discloses a similar process for preparing a laminated ink jet printed image comprising first coating an ink jet image receiving layer onto a clear polyethylene terephthalate base, where after a printed image on the image receiving layer is laminated to a substrate with heat and pressure such that the image bearing layer is in between the substrate and the clear base and is protectively sealed by means of the clear base.

The requirement of an extra ink receiving layer not only adds costs and complexity, but also does not provide a solution for security cards where the ink is printed directly onto the plastic lamella, as e.g. shown by U.S. Pat. No. 3,725,184 (ADDRESSOGRAPH MULTIGRAPH) where lithographic offset inks are printed directly on the vinyl sheet without an ink receiving layer present.

WO 2009/063058 (AGFA GEVAERT) discloses a security laminate comprising at least one biaxially oriented polyester lamella and an adhesion system associated therewith and on at least one side thereof, said adhesion system comprising a layer system comprising a polyester, a polyester-urethane or a copolymer of a chlorinated ethylene. Although these security laminates adhere well to PVC, PC and PETG cards, they lose their adhesive properties when the card surface is printed completely or to a large extent with ink.

Therefore a need exists to provide security laminates based on crystalline polyethylene terephthalate (PET-C) that adhere well to both printed and unprinted PVC, PC and PETG cards without requiring an extra ink receiving layer on the card body.

SUMMARY OF INVENTION

In order to overcome the problems described above, preferred embodiments of the present invention include a security laminate as defined by herein.

It has been surprisingly found that the use in an adhesion layer of a mixture of specific polymers, which each on their own are incapable of adhesion to a printed ink layer, provided a PET-C polymer foil exhibiting excellent adhesion to both printed and unprinted PVC, PC and PETG cards thereby impeding delamination of the security laminate from a security document and falsification of the security document.

Further advantages and embodiments of the present invention will become apparent from the following description.

DETAILED DESCRIPTION OF THE INVENTION

Definitions

Figure 1:
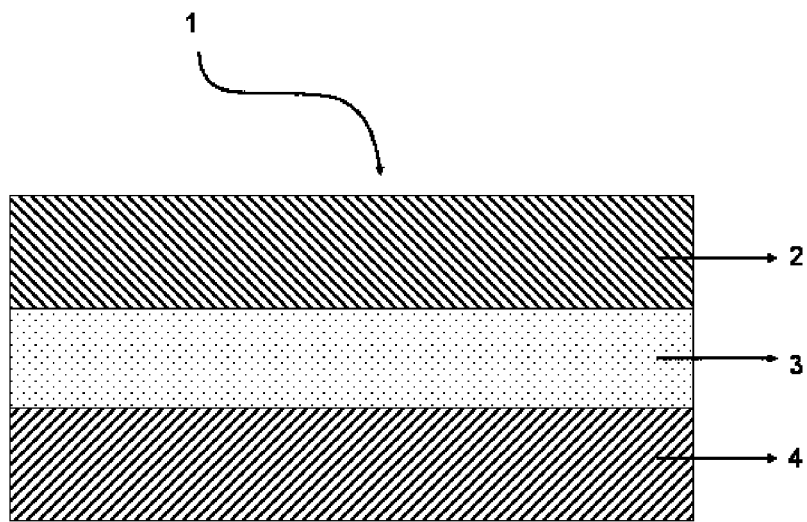
FIG. 1 shows a cross-section of a security laminate (1) including an oriented polyester support (2), a subbing layer (3) and an adhesive layer (4) which is coated on top of the subbing layer.
Figure 2:
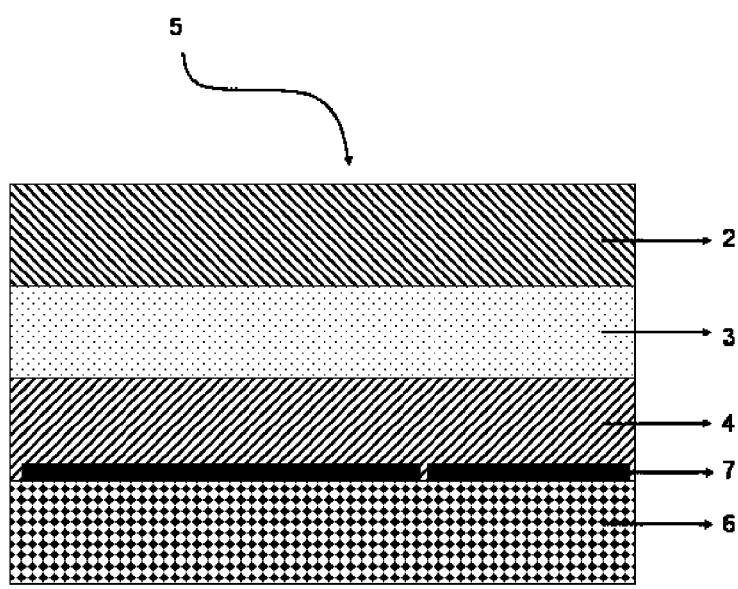
FIG. 2 shows a cross-section of a security document (5) wherein the security laminate (1) of FIG. 1 is laminated on the ink layer (7) of a security document precursor (6).

The terms "support" and "foil", as used in disclosing the present invention, mean a self-supporting polymer-based sheet, which may be associated with one or more subbing layers. Supports and foils are usually manufactured through (co-)extrusion of polymer(s).

The term "layer", as used in disclosing the present invention, is considered not to be self-supporting and is manufactured by coating it on a support or a foil.

The term "lamella", as used in disclosing the present invention, includes one or more foils and one or more layers.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. an oriented polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

Security Laminates and Documents

A security laminate (1) according to the present invention includes in order an oriented polyester support (2), a subbing layer (3) and an adhesive layer (4) which is coated on top of the subbing layer, wherein the binder of the adhesive layer is based on a mixture of a first and a second polymer in a weight ratio from 50/50 to 90/10, wherein the first polymer is a copolymer comprising vinyl acetate and at least 85 wt % of vinyl chloride based on the total weight of the first polymer; wherein the second polymer is a copolymer of styrene, butadiene and methylmethacrylate, a copolymer of vinyl butyral, vinyl acetate and vinyl alcohol and/or particulate polymethylsilsesquioxane.

In a preferred embodiment, the security laminate consists of a oriented polyester support, a subbing layer and an adhesive layer which is coated on top of the subbing layer.

The security laminate has preferably a thickness between 30 µm and 100 µm, more preferably between 50 µm and 80 µm. At such a thickness, the security laminate is very durable and resistant to scratches and chemical substances, while at the same time leaves enough room to incorporate other lamellae and security features into the security document. The format of a security document is standardized. For example, the ID-1 format is specified by ISO 7810 as having the dimensions 85.60 mm×53.98 mm with a thickness of 0.76 mm as specified in ISO 7813. A thickness of 760 µm, as used for bank cards, credit cards, driving licences and smart cards means that if a security card includes two security laminates with a thickness of 80 µm on both outermost sides of the security card that 600 µm is available for other lamellae and security features.

The security laminate as defined above can be advantageously used to impede the falsification of a security document. Falsification involves de-laminating the security laminate from the card, altering the information printed on the card and then re-laminating the card again to close it.

It was found that the security laminate according to the present invention adheres not only to an unprinted security card but also to a printed security card which has 80% or even 100% of its surface covered by ink. This ink may be present in the absence of an absorbing ink receiving layer required for e.g. aqueous inkjet inks which are after dried after jetting and need the absorbing ink receiving layer for obtaining good image quality. An example of an ink which can be applied directly onto the polymeric foils and lamellae is a UV curable offset ink, screen print ink or inkjet ink. It was observed that the adhesion is especially good for acrylate based UV or electron beam curable inks. There is no real restriction on how the ink is applied but offset and inkjet techniques are preferred because of their high speed respectively their variable data printing capability.

A security document (5) according to the present invention includes the security laminate as defined in any above. The security laminate can be laminated onto an ink layer (7) covering more than 80% or even 100% of the surface of a security document precursor (6) and exhibit excellent adhesion properties.

In a preferred embodiment, the security document include the above described security laminate on both sides of its security document core. The security document core includes preferably one or more lamellae selected from the group consisting of an amorphous polyester lamella, a crystalline polyester lamella, a polycarbonate lamella, a polyolefin lamella and a polyvinyl chloride lamella.

The security document is preferably an identification card selected from the group consisting of an identity card, a security card, a driver's license card, a social security card, a membership card, a time registration card, a bank card, a pay card and a credit card. In a preferred embodiment, the security document is a bank card, a pay card or a credit card.

In a preferred embodiment, the security document includes an electronic chip and optionally an antenna. In a preferred embodiment the security document is a so-called radio frequency identification card or RFID-card.

To prevent forgeries of security documents, different means of securing are generally used. The security document according to the present invention may contain other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads. A combination with one of the above security features increases the difficulty for falsifying a security document.

Oriented Polyester Supports

The security laminate according to the present invention includes an oriented polyester support. Orienting a polyester support is achieved by stretching the support in a longitudinal direction, a transversal direction or both directions. The highest crystallinity of the polyester support is obtained by biaxially stretching.

The polyester is preferably biaxially stretched with a stretching factor of at least 2.0, more preferably at least 3.0 and most preferably a stretching factor of about 3.5. The temperature used during stretching is preferably at least 100° C., more preferably at least 140° C. and most preferably about 160° C.

The oriented polyester support is preferably a polyethylene terephthalate or a polyethylene napthalate support.

The oriented polyester support can be transparent, translucent or opaque, and can be chosen from supports well-known from photographic technology. In a preferred embodiment the support is an opaque support. The advantage of an opaque support, preferably of a white colour, is that any information of the security document is more easily readable and that a colour image is more appealing by having a white background.

The oriented polyester support may be a so-called "synthetic paper support" selected from the Synaps™ synthetic papers of Agfa-Gevaert NV.

The support preferably is a single component extrudate, but may also be co-extrudate. Examples of suitable co-extrudates are PET/PETG and PET/PC. Other examples of useful high-quality polymeric supports for the present invention include opaque white polyesters and extrusion blends of polyethylene terephthalate and polypropylene.

Instead of a coloured or whitened support, an opacifying layer can be coated onto a transparent support. Such opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

In the most preferred embodiment, the oriented polyester support is a biaxially stretched polyethylene terephthalate support. Such a polyethylene terephthalate support has excellent properties of dimensional stability and is very durable and resistant to scratches and chemical substances.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

Subbing Layers

The transparent oriented polyester support is provided with a subbing layer. For practical reasons, e.g. drying capacity of the coating alley, the subbing layer may be split up in two or more layers.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the transparent oriented polyester support is provided with a subbing layer including a binder based on a polyester-urethane copolymer.

In a more preferred embodiment, the polyester-urethane copolymer is an ionomer type polyester urethane, preferably using polyester segments based on terephthalic acid and ethylene glycol and hexamethylene diisocyanate.

A suitable polyester-urethane copolymer is Hydran™ APX101H from DIC Europe GmbH.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA);

In a preferred embodiment, the subbing layer has a dry thickness of no more than 2 µm or preferably no more than 200 mg/m$^2$.

Adhesive Layers

The binder of the adhesive layer is based on a mixture of a first and a second polymer in a weight ratio from 50/50 to 90/10, wherein the first polymer is a copolymer comprising vinyl acetate and at least 85 wt % of vinyl chloride based on the total weight of the first polymer; and wherein the second polymer is a copolymer of styrene, butadiene and methylmethacrylate, a copolymer of vinyl butyral, vinyl acetate and vinyl alcohol and/or particulate polymethylsilsesquioxane.

In a preferred embodiment of the security laminate, the first polymer is a vinyl chloride/vinyl acetate copolymer containing at least 85 wt % of vinyl chloride, more preferably at least 90 wt % of vinyl chloride and most preferably at least 92 wt % of vinyl chloride based on the total weight of the first polymer.

In a more preferred embodiment of the security laminate, the first polymer is a hydroxyl-functional, partially-hydrolyzed vinyl chloride/vinyl acetate copolymer containing at least 85 wt % of vinyl chloride, more preferably at least 90 wt % of vinyl chloride and most preferably at least 92 wt % of vinyl chloride based on the total weight of the first polymer.

In a preferred embodiment, the first polymer is a vinyl chloride/vinyl acetate copolymer containing at least 85 wt % of vinyl chloride and at least 3 wt % of vinyl acetate based on the total weight of the binder. The advantage of having at least 3 wt % of vinyl acetate in the first polymer is that the solubility of the polymeric binder is drastically improved in preferred coating solvents, such as methyl ethyl ketone.

Suitable vinyl chloride/vinyl acetate copolymers containing at least 85 wt % of vinyl chloride are the Solbin™ grades from NISSIN CHEMICAL Co. A preferred copolymer is Solbin™ A.

In a preferred embodiment, the second polymer is a copolymer of vinyl butyral, vinyl acetate and vinyl alcohol containing preferably at least 60 mol % of vinyl butyral, more preferably at least 65 mol % of vinyl butyral and most preferably at least 70 mol % of vinyl butyral and preferably at most 40 mol % of vinyl alcohol, more preferably at most 30 mol % of vinyl alcohol and most preferably at most 26 mol % of vinyl alcohol. The vinyl acetate content in the second polymer is preferably at most 5 mol %, more preferably at most 3 mol %.

Suitable copolymers of vinyl butyral, vinyl acetate and vinyl alcohol are the S-Lec™ grades from SEKISUI.

In another preferred embodiment, the second polymer is a copolymer of styrene, butadiene and methylmethacrylate. A suitable copolymer of styrene, butadiene and methylmethacrylate is Zylar™ 631 from INEOS.

The polymeric binder is preferably present in the adhesive layer in an amount of 3 to 30 g/m², more preferably in an amount of 5 to 20 g/m².

In a preferred embodiment, the thickness of the adhesive layer is between 1 µm and 12 µm.

Other Polymeric Foils and Lamellae

Suitable polymeric foils for the core of the security document include cellulose acetate propionate or cellulose acetate butyrate, polyesters such as polyethylene terephthalate and polyethylene naphthalate, polyamides, polycarbonates, polyimides, polyolefins, polyvinyl chlorides, polyvinylacetals, polyethers and polysulphonamides.

The polymeric foils and lamellae of the core can be transparent, translucent or opaque, and can be chosen from supports well-known from photographic technology. In a preferred embodiment the support is an opaque support. The advantage of an opaque support, preferably of a white colour, is that any information of the security document is more easily readable and that a colour image is more appealing by having a white background.

The polymeric foils and lamellae include resin coated paper supports, such as polyethylene coated paper and polypropylene coated paper, and synthetic paper supports such as Synaps™ synthetic paper of Agfa-Gevaert NV.

The polymeric foils and lamellae may be a single component extrudate, but can also be co-extrudate. Examples of suitable co-extrudates are PET/PETG and PET/PC. Other examples of useful high-quality polymeric foils and lamellae for the present invention include opaque white polyesters and extrusion blends of polyethylene terephthalate and polypropylene. Also Teslin™ may be used as support.

Polyester foils and lamellae and especially polyethylene terephthalate polymeric foils and lamellae are preferred because of their excellent properties of dimensional stability.

Instead of a coloured or whitened support, an opacifying layer can be coated onto a transparent support. Such opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

Methods to obtain opaque polyethylene terephthalate and biaxially oriented films thereof of have been disclosed in, e.g. US 2008238086 (AGFA).

Coating Solvents & Methods

For coating the adhesive layer, one or more organic solvents may be used. The use of an organic solvent facilitates the dissolution of the polymeric binder.

A preferred organic solvent is methylethylketone (MEK) because it combines a high solubilizing power for a wide range of ingredients and it provides, on coating the colour forming layer, a good compromise between the fast drying of the colour forming layer(s) and the danger of fire or explosion thereby allowing high coating speeds.

The coating composition of the adhesive layer can be coated using any conventional coating technique, such as dip coating, knife coating, extrusion coating, spin coating, slide hopper coating and curtain coating.

Methods for Preparing Security Laminates

A method of preparing a security laminate including the steps of: a) stretching a polyester substrate in either a longitudinal or a transversal direction; b) coating and drying a subbing layer on the stretched polyester substrate; c) stretching the coated polyester substrate in the longitudinal or transversal direction not selected in step a) in order to obtain a coated biaxially stretched polyester substrate having a subbing layer; d) coating and drying an adhesive layer on top of the dry subbing layer, wherein the subbing layer contains a binder selected from the group consisting of a hydroxyl-functional, partially-hydrolyzed vinyl chloride/vinyl acetate copolymer and a polyester-urethane copolymer; wherein the adhesive layer contains a mixture of a first and a second polymer in a weight ratio from 50/50 to 90/10, wherein the first polymer is a copolymer comprising vinyl acetate and at least 85 wt % of vinyl chloride based on the total weight of the first polymer; and wherein the second polymer is a copolymer of styrene, butadiene and methylmethacrylate, a copolymer of vinyl butyral, vinyl acetate and vinyl alcohol and/or particulate polymethylsilsesquioxane.

In the method according to the present invention, the polyester substrate is preferably a polyethylene terephthalate substrate.

In the method according to the present invention, the thickness of the dry adhesive layer is preferably between 1.0 µm and 12.0 µm.

In the method according to the present invention, the coated biaxially stretched polyester substrate of step c) has preferably a dry thickness of less than 80 µm.

Other Ingredients

The adhesive layer in the security laminate according to the present invention may include other ingredients as long as it does not deteriorate the adhesion strength towards other lamellae or PETC in such a manner that easy delamination can be accomplished.

Such ingredients include, for example, surfactants to enhance the coating quality. The surfactant is preferably an anionic or non-ionic surfactant.

The security laminate according to the present invention preferably includes one or more UV blocking agents to protect light fading of the ink image in the security document. Suitable UV blocking agents include hindered amine light stabilizers and benzotriazole derivatives such as 2-(3'-tert-butyl-5'-(2-octyloxycarbonylethyl)-2'-hydroxyphenyl)-5-chlorobenzotriazole, 2-(2-hydroxy-3-tert-butyl-5-methylphenyl)-5-chloro-2H-benzotriazole, 2-(2-hydroxy-3,5-di-α-cumylphenyl)-2H-benzotriazole, 2-(2-Hydroxy-3,5-di-tert-butylphenyl)-5-chlorobenzotriazole and 2,2'-methylenebis[4-(1,1,3,3-tetramethylbutyl)-6-benzotriazol-2-ylphenol]. Commercial examples include Tinuvin™ 109, Tinuvin™ 213, Tinuvin™ 234, Tinuvin™ 326, Tinuvin™ 327 and Tinuvin™ 360 available from CIBA.

Other ingredients include thickeners, antistatic agents and the like.

INDUSTRIAL APPLICATION

The security laminates according to the present invention can be used in identity documents such as driver's licenses, ID-cards and passports, and on other important documents such as certificates of title. Security laminates are also useful as tamper proof seals on medications, video cassettes, and compact discs.

EXAMPLES

Materials

All materials used in the following examples were readily available from standard sources such as ALDRICH CHEMICAL Co. (Belgium) and ACROS (Belgium) unless otherwise specified. The water used was deionized water.

Hydran™ APX101H is a waterbased liquid of ionomer type polyester urethane using polyester segments based on terephthalic acid and ethylene glycol and hexamethylene diisocyanate available from DIC Europe GmbH.

Resorcinol from Sumitomo Chemicals.

Resor-sol is a 7.4 wt % aqueous solution of resorcinol (pH 8).

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Solbin™ A is a copolymer of 92% vinyl chloride, 3% vinyl acetate and 5% vinyl alcohol from NISSIN CHEMICAL Co.

Solbin™ TA 3 is a copolymer of 83% vinyl chloride, 4% vinyl acetate and 13% hydroxyalkyl acrylate from NISSIN CHEMICAL Co.

Solbin™ M5 is a copolymer of 85% vinyl chloride, 14% vinyl acetate and 1% fumaric acid from NISSIN CHEMICAL Co.

Solbin™ MFK is a copolymer of 90% vinyl chloride, 7% vinyl acetate and 3% acrylic acid from NISSIN CHEMICAL Co.

Laroflex™ MP15 is a copolymer of vinyl chloride and bvinylisobutylether from BASF.

Vinnol™ H40-60 is a copolymer of 61 wt % vinyl chloride and 39 wt % of vinyl acetate from WACKER-CHEMIE.

S-Lec™ BL-10 is a polyvinyl butyral copolymer including a hydroxyl content of 26 mol %, a buytyral content of at least 71 mol % and an acetal of maximum 3 mol % available from SEKISUI.

Zylar™ 631 is a styrene-butadiene-methylmethacrylate copolymer of INEOS.

CAB™ 381-2 is a cellulose acetate butyrate copolymer from EASTMAN KODAK.

Elvacite™ 2010 is polymethylmethacrylate homopolymer from ICI.

Tospearl™ 145 is a polymethylsilsesquioxane with an average particle size 4.5 μm from GENERAL. ELECTRIC.

Measurement Methods
1. Adhesion

The delamination resistance of the laminates were evaluated using the test method for dry peel strength described in ISO/IEC 7810:1995 with an Instron. The evaluation score used in the examples is given by Table 1.

TABLE 1

| Evaluation score | Evaluation |
| --- | --- |
| OK | No delamination possible, immediate tearing of one of the lamellae. The peelstrength is higher than 3.5 N/cm. |
| Not OK | Delamination possible with a peel strength of less than 3.5 N/cm. |

Preparation of PET-1

A coating composition SUB-1 was prepared by mixing the components according to Table 2 using a dissolver.

TABLE 2

| Components of SUB-1 | Volume (L) |
| --- | --- |
| deionized water | 700.9 |
| Hydran ™ APX101H | 146.6 |
| Resor-sol | 125.0 |
| PAR-sol | 5.0 |
| PEA-sol | 7.5 |
| DOW-sol | 15.0 |

After stretching a 1,100 μm thick polyethylene terephthalate substrate longitudinally, the coating composition SUB-1 was coated onto the longitudinally stretched PET and dried. The coated longitudinally stretched PET was then transversally stretched to produce a 63 μm thick transparent and glossy subbed biaxially stretched polyethylene terephthalate substrate PET-1. The dry thickness of the subbing layer coated from SUB-1 was 211 mg/m².

Preparation of Coating Compositions

The coating compositions AC-1 to AC-22 were all prepared in the same manner by mixing the components according to Table 3 using a dissolver.

TABLE 3

| Component | Amount (in g) |
| --- | --- |
| MEK | 349.9 |
| Binder | 50.0 |
| Tospearl ™ 145 | 0.1 |

The coating composition AC-23 was prepared in the same manner by mixing the components according to Table 4 using a dissolver.

TABLE 4

| Component | Amount (in g) |
| --- | --- |
| MEK | 183.0 |
| Solbin ™ A | 26.5 |
| Tospearl ™ 145 | 5.0 |

Table 5 shows the binder used in each of the coating compositions AC-1 to AC-23. The minute amount of Tospearl™ 145 in the coating compositions AC-1 to AC-22 is ignored in Table 5.

TABLE 5

| Coating composition | Binder adhesive layer | | Ratio of First polymer over Second Polymer |
|---|---|---|---|
| | First polymer | Second polymer | |
| AC-1 | Solbin ™ A | — | n.a. |
| AC-2 | Solbin ™ TA 3 | — | n.a. |
| AC-3 | Solbin ™ M5 | — | n.a. |
| AC-4 | Solbin ™ MFK | — | n.a. |
| AC-5 | Laroflex ™ MP15 | — | n.a. |
| AC-6 | Vinnol ™ H40-60 | — | n.a. |
| AC-7 | — | S-Lec ™ BL-10 | n.a. |
| AC-8 | — | Zylar ™ 631 | n.a. |
| AC-9 | Solbin ™ A | CAB ™ 381-2 | 90/10 |
| AC-10 | Solbin ™ A | CAB ™ 381-2 | 50/50 |
| AC-11 | Solbin ™ A | Elvacite ™ 2010 | 90/10 |
| AC-12 | Solbin ™ A | Elvacite ™ 2010 | 50/50 |
| AC-13 | Solbin ™ A | S-Lec ™ BL-10 | 90/10 |
| AC-14 | Solbin ™ A | S-Lec ™ BL-10 | 80/20 |
| AC-15 | Solbin ™ A | S-Lec ™ BL-10 | 70/30 |
| AC-16 | Solbin ™ A | S-Lec ™ BL-10 | 60/40 |
| AC-17 | Solbin ™ A | S-Lec ™ BL-10 | 50/50 |
| AC-18 | Solbin ™ A | Zylar ™ 631 | 90/10 |
| AC-19 | Solbin ™ A | Zylar ™ 631 | 80/20 |
| AC-20 | Solbin ™ A | Zylar ™ 631 | 70/30 |
| AC-21 | Solbin ™ A | Zylar ™ 631 | 60/40 |
| AC-22 | Solbin ™ A | Zylar ™ 631 | 50/50 |
| AC-23 | Solbin ™ A | Tospearl ™ 145 | 86/14 |

The coating compositions AC-1 to AC-12 and AC-13 to AC-22 were coated with an Elcometer Bird Film Applicator (from ELCOMETER INSTRUMENTS) on the subbed PET-C support PET-1 at a wet coating thickness of 80 µm and subsequently dried for 2 minutes at 20° C. on the film applicator and for a further 15 minutes in an oven at 50° C. to deliver the comparative security laminates COMP-1 to COMP-12 respectively the inventive security laminates INV-1 to INV-10.

Evaluation and Results

A 500 µm opaque PETG core from WOLFEN was used as a blank card. The comparative security laminates COMP-1 to COMP-12 and the inventive security laminates INV-1 to INV-11 were each laminated on a blank card and on the same card having printed thereon acrylate based UV curable ink (UV-Sicura™ Card 110N WA available from SIEGWERK AG) at a 100% coverage of the surface of the card. The lamination was performed using an Oasys OLA6/7 plate laminator with the settings: LPT=115° C., LP=40, Hold=210 sec, HPT=115° C., HP=40 and ECT=50° C. The results for delamination of the security laminate are shown in Table 6.

TABLE 6

| Security Laminate | Coating composition | Adhesion on | |
|---|---|---|---|
| | | Blank card | Printed Card |
| COMP-1 | AC-1 | OK | Not OK |
| COMP-2 | AC-2 | | Not OK |
| COMP-3 | AC-3 | | Not OK |
| COMP-4 | AC-4 | | Not OK |
| COMP-5 | AC-5 | | Not OK |
| COMP-6 | AC-6 | | Not OK |
| COMP-7 | AC-7 | Not OK | Not OK |
| COMP-8 | AC-8 | Not OK | Not OK |
| COMP-9 | AC-9 | | Not OK |
| COMP-10 | AC-10 | | Not OK |
| COMP-11 | AC-11 | | Not OK |
| COMP-12 | AC-12 | | Not OK |
| INV-1 | AC-13 | OK | OK |
| INV-2 | AC-14 | OK | OK |
| INV-3 | AC-15 | OK | OK |

TABLE 6-continued

| Security Laminate | Coating composition | Adhesion on | |
|---|---|---|---|
| | | Blank card | Printed Card |
| INV-4 | AC-16 | OK | OK |
| INV-5 | AC-17 | OK | OK |
| INV-6 | AC-18 | OK | OK |
| INV-7 | AC-19 | OK | OK |
| INV-8 | AC-20 | OK | OK |
| INV-9 | AC-21 | OK | OK |
| INV-10 | AC-22 | OK | OK |
| INV-11 | AC-23 | OK | OK |

From Table 6, it should be clear that only the mixture of polymers used in the adhesive layer of the inventive security laminates INV-1 to INV-11 was capable of preventing falsification by delamination of the security laminate from both unprinted and printed cards. This is remarkable since none of the polymers used in the mixture exhibit any adhesion to a printed ink layer as shown by comparative security laminates AC-1, AC-7 and AC-8

The invention claimed is:

1. A security laminate including in order an oriented polyester support, a subbing layer, and an adhesive layer which is coated on top of the subbing layer, wherein the binder of the adhesive layer is based on a mixture of a first and a second polymer in a weight ratio from 50/50 to 90/10,
   wherein the first polymer is a copolymer comprising vinyl acetate and at least 85 wt % of vinyl chloride based on the total weight of the first polymer;
   wherein the second polymer is a copolymer of styrene, butadiene and methylmethacrylate or a copolymer of vinyl butyral, vinyl acetate and vinyl alcohol.

2. The security laminate according to claim 1, wherein the binder of the subbing layer is based on a polyester-urethane copolymer.

3. The security laminate according to claim 1, wherein the oriented polyester support is a biaxially stretched polyethylene terephthalate support.

4. The security laminate according to claim 2, wherein the oriented polyester support is a biaxially stretched polyethylene terephthalate support.

5. The security laminate according to claim 1, wherein the first polymer is a hydroxyl-functional, partially-hydrolyzed vinyl chloride/vinyl acetate copolymer.

6. The security laminate according to claim 2, wherein the first polymer is a hydroxyl-functional, partially-hydrolyzed vinyl chloride/vinyl acetate copolymer.

7. The security laminate according to claim 4, wherein the first polymer is a hydroxyl-functional, partially-hydrolyzed vinyl chloride/vinyl acetate copolymer.

8. The security laminate according to claim 1, wherein the thickness of the adhesive layer is between 1 µm and 12 µm.

9. The security laminate according to claim 4, wherein the thickness of the adhesive layer is between 1 µm and 12 µm.

10. The security laminate according to claim 7, wherein the thickness of the adhesive layer is between 1 µm and 12 µm.

11. The security laminate according to claim 1, having a thickness between 23 µm and 80 µm.

12. A security document containing the security laminate as defined in claim 1.

13. The security document according to claim 12, wherein the security laminate is laminated onto an ink layer covering more than 80% of the surface of a security document precursor.

14. The security document according to claim 12 containing the security laminate on both sides of its security document core.

15. The security document according to claim 14, wherein the security document core includes one or more lamellae selected from the group consisting of an amorphous polyester lamella, a crystalline polyester lamella, a polycarbonate lamella, a polyolefin lamella and a polyvinyl chloride lamella.

16. The security document according to claim 12, wherein the security document includes an electronic chip and optionally an antenna.

17. A method of preparing a security laminate including the steps of:
   a) stretching a polyester substrate in either a longitudinal or a transversal direction;
   b) coating and drying a subbing layer on the stretched polyester substrate;
   c) stretching the coated polyester substrate in the longitudinal or transversal direction not selected in step a) in order to obtain a coated biaxially stretched polyester substrate having a subbing layer; and
   d) coating and drying an adhesive layer on top of the dry subbing layer, wherein the adhesive layer contains a mixture of a first and a second polymer in a weight ratio from 50/50 to 90/10,
   wherein the first polymer is a copolymer comprising vinyl acetate and at least 85 wt % of vinyl chloride based on the total weight of the first polymer;
   wherein the second polymer is a copolymer of styrene, butadiene and methylmethacrylate or a copolymer of vinyl butyral, vinyl acetate and vinyl alcohol.

18. The method according to claim 17, wherein the subbing layer contains a binder selected from the group consisting of a hydroxyl-functional, partially-hydrolyzed vinyl chloride/vinyl acetate copolymer and a polyester-urethane copolymer.

19. The method according to claim 17, wherein the polyester substrate is a polyethylene terephthalate substrate.

20. The method according to claim 18, wherein the polyester substrate is a polyethylene terephthalate substrate.

21. A method of impeding the falsification of a security document comprising attaching a security laminate as defined in claim 1 to a security document.

* * * * *